United States Patent [19]
Goff et al.

[11] Patent Number: 5,995,112
[45] Date of Patent: Nov. 30, 1999

[54] COLOR SIGNATURE DETECTION OF OBJECTS ON A COMPUTER DISPLAY

[75] Inventors: Lonnie C. Goff; Mark Eidson, both of Tempe; Peter Chambers, Phoenix; David R. Evoy, Tempe, all of Ariz.

[73] Assignee: VLSI Technology, Inc., San Jose, Calif.

[21] Appl. No.: 08/879,152

[22] Filed: Jun. 19, 1997

[51] Int. Cl.[6] .................................................. A63F 9/22
[52] U.S. Cl. ............................................. 345/431; 345/156
[58] Field of Search ................................... 345/418, 429, 345/431, 433, 156; 463/5, 29, 43, 57, 52, 50, 51

[56] References Cited

U.S. PATENT DOCUMENTS 4,813,682  3/1989  Okada ........................................ 345/156

*Primary Examiner*—Phu K. Nguyen
*Assistant Examiner*—Cliff N. Vo
*Attorney, Agent, or Firm*—Burns, Doane, Swecker & Mathis LLP

[57] ABSTRACT

A method and system for detecting objects displayed on a display screen is described. Each object displayed on the screen visually emits a unique identification signal in the form of a color signal having multiple color components. The relative peak amplitude of each color component in the color signal is detected by sampling the color signal with photo-sensors corresponding to each color component. The sampled color components are digitized and transmitted to the display screen graphics controller thereby indicating to the controller the object on the screen at which the detector is pointed.

25 Claims, 3 Drawing Sheets

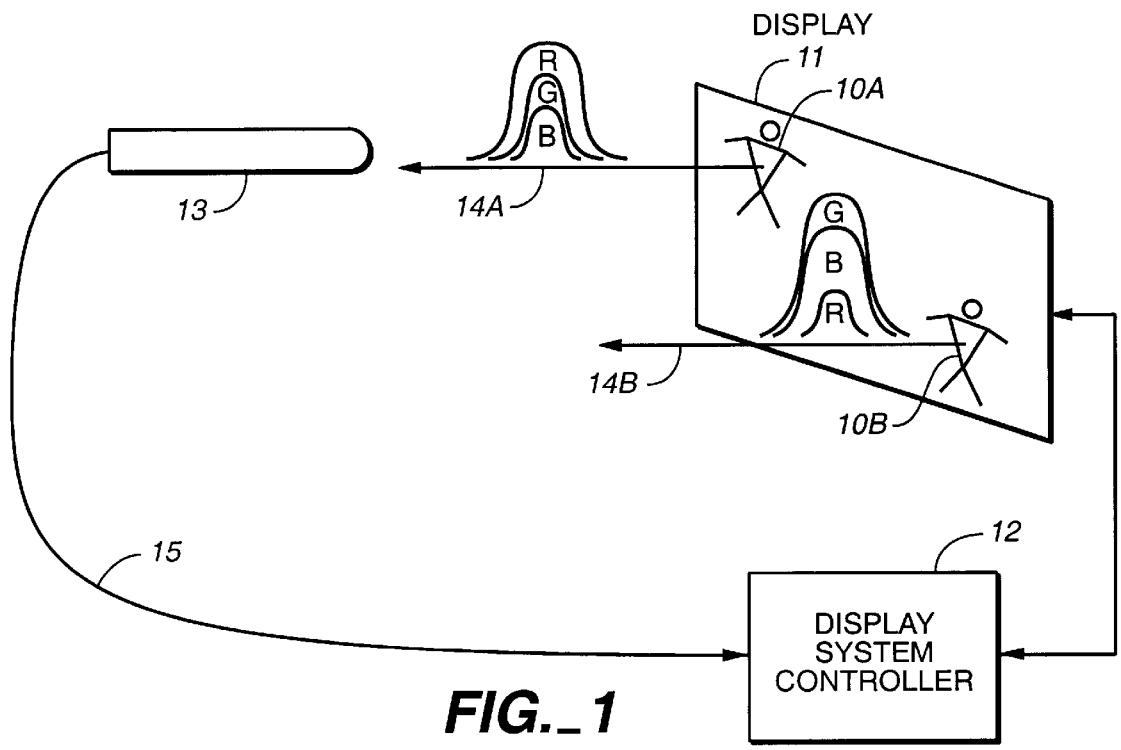
FIG._1
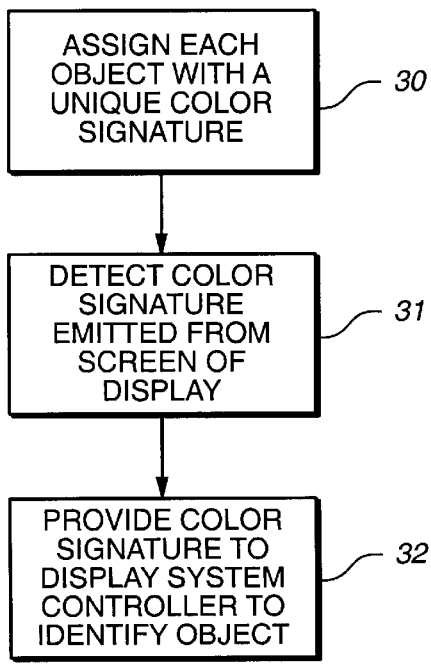
FIG._4

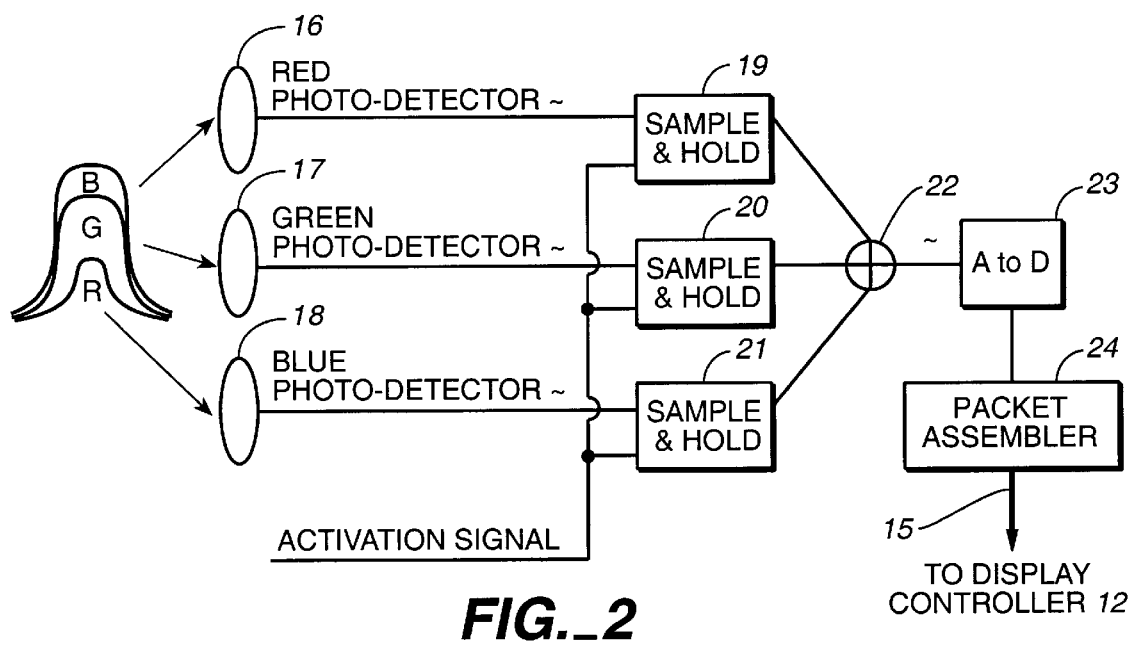
FIG._2
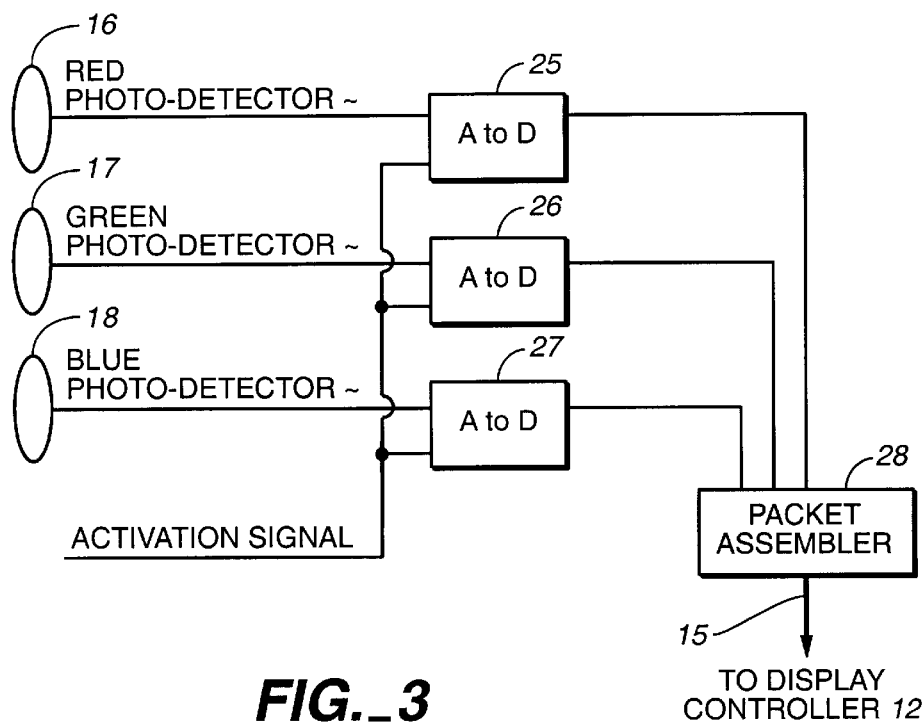
FIG._3

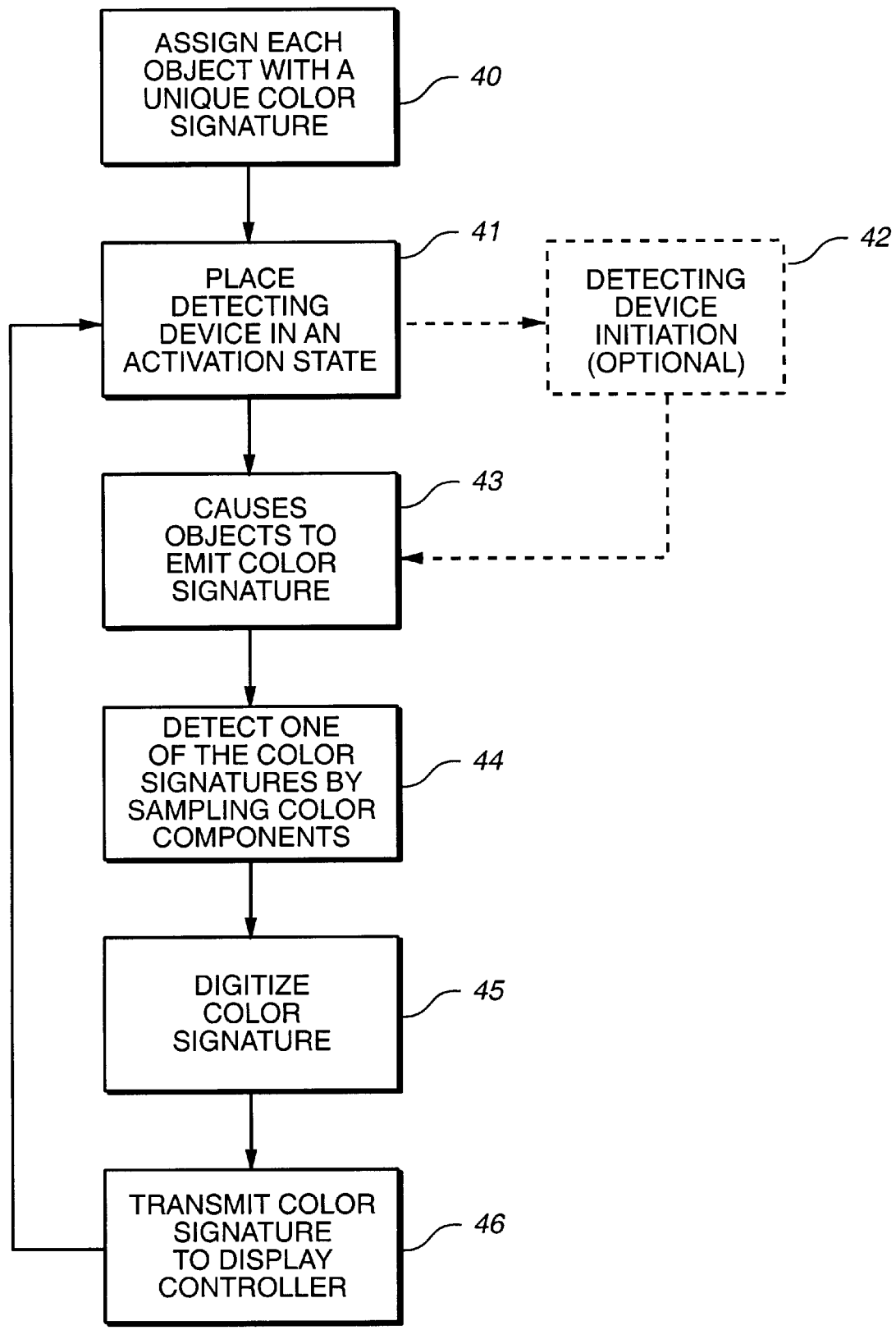
FIG._5

COLOR SIGNATURE DETECTION OF OBJECTS ON A COMPUTER DISPLAY

BACKGROUND OF THE INVENTION

1. Field of the Invention

The present invention relates to a system for the detection of objects on a display screen, and more particularly, to a system for detecting objects on a display screen using an external detection pointing device.

2. State of the Art

Typically, graphical display systems include a display screen having an associated cathode-ray tube (CRT) in which an electron beam is scanned across a photosensitive layer of material, such as phosphorous, to cause an image to be displayed on the screen. The image can include a collection of objects or can be textual. The electron beam, and hence, the image is typically controlled by a CRT and graphics controller. Often, such systems include a human interface device which allows a system user to interact with the information being displayed on the screen. In particular, one specific type of user interface is one in which the user aims at the screen and the location at which the interface is aimed is determined by the graphics or CRT controller.

One example of a graphical display system having the above-described type of user interface is a video game system. Typically, a video game displays moving objects on a screen. The user interface is often embodied as a pointing or aiming device such as an arcade gun having a trigger. In use, a user aims the detector at objects on the screen and depresses the trigger. If the detector is aligned with the position of one of the objects on the screen a "hit" is achieved, if not a "miss" occurs. Hence, in this type of system, the graphical display system operates as if it recognizes whether the detector is pointing at a given object on the display screen.

One manner in which such apparent "point on shoot" operation is achieved is by using a CRT row/column counter that tracks the location of the electron beam on the screen the CRT beam is scanning. While aiming the device at the screen, the user transmits a pulse to the display system CRT or graphics controller (e.g., by pulling the trigger of an arcade gun) which causes the most current row/column values of the counter to be latched. These values represent where the detector was pointed when the trigger was depressed. In this system, the connection between the detector and the row/column circuitry is a relatively fast communication path (typically, directly wired) and hence, by the time the pulse is transmitted from the detector to the row/column circuitry, the difference between the actual location of the detector and the latched row/column location is relatively small. Hence, the accuracy of this detection technique relies on a fast communication path between the detector device and the row/column circuitry.

Recently graphical display systems are being designed such that the connection between the user interface (i.e. the aiming detector device) and the display system is a software controlled interface. Specifically, the connection can be embodied as a polled interface in which the user interface cannot initiate a communication with the host system (i.e. the graphics or system controller) on its own. Instead, it is first polled by the host system. Hence, with respect to the above object detection system, the host system would need to poll the detector device prior to the detector device providing the pulse to the row/column circuitry to latch its location. However, since this communication process can take a relatively long time, object detection accuracy is greatly diminished using the above technique which relies on a "fast" path between the detecting device and the CRT control circuitry.

What is needed is a system and method for detecting objects on a display screen which is not constrained by the speed of the communication path between the aiming detector device and the display system controller.

SUMMARY OF THE INVENTION

The present invention, briefly stated, is a system and method for detecting objects on a display screen by providing each object displayed by the screen with a particular identification signal. The objects emit an identification signal from the screen of the system which is detectable by an external pointing detector device. The external detector device then transmits back to the display screen controller the object's identification signal thereby indicating which object the detecting device is pointing at on the screen. The display screen controller can then determine the location of the point at which the detector device is directed towards since it knows the location of each object on the screen using a system software application.

In one embodiment, the objects represent targets in a video game and the pointing device is implemented as a video arcade gun used to "shoot" at the objects. The location information passed to the display controller can then be used to determine a "hit" or a "miss" of the target. Depressing the trigger of the gun puts it into an active-state. When this occurs, all or a portion of the objects on the screen begin to emit their corresponding identification signal. The arcade gun detects the identification signal corresponding to the object on the screen that it is directed towards and transmits this signal to a display system controller. Communication between the detection device and the display system controller, in one embodiment, is performed over a polled serial bus such as a universal serial interface.

In one embodiment, the identification signal is embodied as a color signal (referred to as a color signature). In this case, the detector includes a separate color sensitive sensor for detecting the amplitude of each color component of the color being emitted. In the case in which the objects emit a color signal that is made-up of the three primary colors (i.e. red, blue and green) the detector includes three color sensors; a red photo-sensitive detector, a green photo-sensitive detector, and a blue photo-sensitive detector. This information is then processed and transmitted to the display controller. The relative amplitudes of the color components are used to identify the object on the screen that the detector is aimed at.

BRIEF DESCRIPTION OF THE DRAWINGS

FIG. 1 shows a block diagram of one embodiment of a system for performing object detection in accordance with the present invention.

FIG. 2 shows a first embodiment of a color detection device for detecting objects on a display screen in the system as shown in FIG. 1.

FIG. 3 shows a second embodiment of a color detection device for detecting objects on a display screen in a system as shown in FIG. 1.

FIG. 4 shows a flow chart of the steps of one embodiment of a method for detecting objects on a display screen.

FIG. 5 shows a flow chart of the steps of another embodiment of a method for detecting objects on a display screen.

DESCRIPTION OF PREFERRED EMBODIMENTS

FIG. 1 shows a block diagram of a graphical display system illustrating the general concept of the object detection system and method of the present invention. The graphical display system includes a display screen 11, a display system controller 12, and a user interface unit 13.

The display system controller unit 12 can include various control elements such as the system CPU, graphics control elements, CRT control elements, communication interface control, and in general, elements that provide control to cause the display system to produce an image or text on screen 11. The system CPU can include an application that drives the graphics and CRT control elements to cause a video game to be displayed on the screen. Typically, the application is able to track the location of the objects displayed on the screen. The control elements of the display system controller 12 can be implemented in both software and hardware.

In one embodiment, display screen 11 is a conventional cathode ray tube in which an electron beam, controlled by a CRT controller (not shown), is scanned across a phosphorus screen causing objects 10A and 10B to be displayed.

The light detecting device 13 includes a sensor for detecting color emitted from the screen. In one embodiment, the detecting device 13 is an arcade gun, a light pen, or a game console pointing device. In accordance with the embodiment shown in FIG. 1, display system controller 12 causes all or a portion of the objects on the screen to emit a unique color signal (referred to as a color signature). FIG. 1 shows object 10A emitting a first color signature 14A and object 10B emitting a second color signature 14B. When detecting device 13 is aimed at a given object on screen 11 it detects the peak amplitude of each color component in the object's unique color signature. This information is then processed and transmitted over bus 15 to display system controller 12. The display system controller 12 is then able to determine which object that the detecting device 13 is pointed at since it knows each objects corresponding color signature.

The color signature of each object is made-up of a plurality of color components. The relative amplitude of the color components are unique to each object so as to produce a unique color for each object. The color signature can either be continuously displayed or flashed from a first color to the color signature color. In one embodiment, the object flashes between the "normal" color of the object and the color signature. All or only a select group of objects on the screen emit their corresponding color signature. The signature can be repeated for a short burst of time until the detecting device is able to recognize a valid signature or may be continuously displayed.

FIG. 2 shows a first embodiment of the detector device 13 shown in FIG. 1 including red, green, and blue photosensitive detectors (16–18) for detecting a color signature having red, green, and blue components. Also included are sample and hold circuits 19–21 each corresponding to detectors 16–18, respectively. In response to the activation signal of the detector (initiated, for example, by pulling the trigger of an arcade gun) the sample and hold circuits obtain voltage samples of each color component. The activation signal is synchronized so as to cause the sample and hold circuits to sample the detected signals at the peak of the incoming light. The samples are consecutively provided via time multiplexing interface 22 to analog-to-digital converter 23 and each of the analog voltage samples are converted into an independent digital word. The digital words may be appended to form a single digital word and then packetized into an appropriate format for transmitting on interface 15 to the display system controller 12 or may be individually packetized and transmitted. In the case in which interface 15 is a universal serial bus (USB), the samples are packetized into a USB format. It should be understood that color detectors employed in the detector shown in FIG. 2 are dependent on the color components that make-up the color signature.

FIG. 3 shows another embodiment of detector 13 in which separate analog-to-digital converters 25–27 (each including a sample and hold circuit, not shown) is used to obtain samples of the color components and then digitize the samples. Once digitized, the samples are put in packet format by consecutively providing the digitized samples to the packet assembler 28 and transmitting the packetized color signature.

One embodiment of the system and method of the present invention is implemented such that a universal serial bus (USB) interface couples the detecting device 13 to display system controller 12. A USB interface is a polled type of interface in which devices cannot communicate on the interface unless polled by the host operating system. In general, interface software handles the communication and protocol issues associated with communicating on the interface. Prior to transmission on a USB interface, data is put in a packetized format. Consequently, in an embodiment of the present invention in which connection 15 is implemented as a USB interface, the digitized color components (individually or in combination) are first packetized to put into a form adaptable to the USB interface. It should be understood that connection 15 can be embodied as other types of bus interfaces as well as a USB interface.

FIG. 4 shows a flow chart illustrating one method of detecting objects in a graphical system such as shown in FIG. 1. In accordance with this method, each object is assigned a unique color signature (block 30), the color signature is detected by a detecting device (block 31) which is subsequently provided to the display system controller (block 32) for determination of which object that detecting device 13 is pointed at.

FIG. 5 shows a flow chart illustrating another method of detecting objects in a graphical system such as shown in FIG. 1. In this embodiment, each object is assigned with a unique color signature (block 40). The detecting device 13 is placed in an activation state (block 41). This is typically done by the user engaging the trigger of the video arcade gun or depressing a button on a light pen while aiming it at the screen. Once activated, the detecting device is optionally initiated (block 42) or reset to clear all preceding detected samples. The initiation can be an automatic event that occurs simultaneously at the detecting device when the detecting device is activated or can be controlled by the display system control. Next, the objects are caused to emit their corresponding unique color signature (block 43). At this point the detecting device 13 detects the amplitude of each color component of the color signature of the object that it is aimed at (block 44) by sampling each of the color components at the peak of the color signature signal. The detected color component samples are digitized and transmitted to the display system controller (blocks 45 and 46). The display system controller recognizes the color signature by evaluating the relative amplitudes of each detected color component. In the case of a video game having targets, the color signature of the detected target can be provided to a game application in the display system controller to determine which target the gun is aimed at and whether a "hit" or "miss" has occurred.

In the case in which connection 15 is implemented as a universal serial bus (USB), communication between the detecting device and the display system controller is performed in accordance with USB interface communication techniques. In particular, the display system controller needs to poll the detecting device before the detector can indicate that it is in an active state. Similarly, the detecting device needs to be polled before transmitting the detected color signature. In addition, prior to transmitting on the USB bus, data can also be packetized according to the USB interface format. Hence in the above described flow charts, additional steps are performed depending on the type of communication method being implemented on connection 15. In addition, it should be understood that other steps performed by the display system controller are not described in detail such as what operations are carried out by software applications once the color signature data is received.

It should be noted that in prior art systems the object detection accuracy relies upon a quick response signal from the detector to the display controller so as to latch an e-beam x/y coordinate counting device. Hence, the accuracy of these prior art systems is dependent on how fast the signal is able to travel from the detecting device 13 to CRT controller to latch in the correct position coordinate of the object. In contrast, the detection of objects in the system shown in FIG. 1 does not rely upon latching in coordinate values of an x/y counter in the display controller and hence minimizes the time constraints of transmitting a detection signal from the detecting device to the system controller.

In the preceding description, specific details are set forth, such as detector device elements and system bus interface type in order to provide a thorough understanding of the present invention. It will be apparent, however, to one skilled in the art that these specific details need not be employed to practice the present invention. In other instances, well-known display system structures have not been described in detail in order to avoid unnecessarily obscuring the present invention.

Moreover, although the elements of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What is claimed is:

1. A method of detecting objects on a display screen having an associated controller comprising the steps of:
   causing each of a plurality of said objects to visually emit an unique object identification signal on said screen;
   detecting at least one of said object identification signals emitted from said screen corresponding to at least one of said objects;
   providing to said controller said at least one object identification signal;
   identifying said at least one object on said screen with said unique object identification signal using said controller.

2. The method as described in claim 1 wherein said unique object identification signal is an unique color signal which is emitted from said screen including a set of color components.

3. The method as described in claim 2 wherein said step of detecting comprises detecting the peak amplitude of each of said color components of said color signal.

4. The method as described in claim 3 wherein said step of detecting further comprises the steps of sampling said peak amplitude of each color component and digitizing said sampled color components.

5. The method as described in claim 4 wherein each of said objects is identifiable by said peak amplitudes of said color components relative to each other.

6. The method as described in claim 2 wherein said step of detecting further comprises the steps of setting a detecting device in an active-state.

7. The method as described in claim 6 wherein said step of detecting further comprises the step of initializing said detecting device by clearing all preceding detected sampled color components.

8. The method as described in claim 2 wherein said step of detecting is performed by aiming a detecting device at said at least one of said objects.

9. The method as described in claim 2 wherein said step of providing to said controller comprises transmitting said at least one color signal on a universal serial bus.

10. The method as described in claim 6 wherein said plurality of said objects emit said unique color signal after said detecting device is set into said active state.

11. A system for detecting objects on a screen comprising:
    a display screen for displaying objects;
    a display system controller for causing each of a plurality of said objects to visually emit an unique object identification signal corresponding to each of said plurality of objects from said screen for at least a portion of the time said plurality of objects are displayed;
    a detector for detecting at least one of said object identification signals and providing to said controller said at least one of said object identification signals;
    said display system controller utilizing said at least one of said object identification signals to identify at least one of said plurality of said objects on said screen.

12. The system as described in claim 11 wherein said unique object identification signal is a color signal corresponding to each object which is emitted from said screen including a set of color components.

13. The system as described in claim 12 wherein said detector is set in an active-state prior to detecting said color signal.

14. The system as described in claim 12 wherein said detector is initialized prior to detecting said color signal.

15. The system as described in claim 12 wherein said detector and said display system controller communicate over a serial bus.

16. The system as described in claim 15 wherein said serial bus is a polled interface.

17. The system as described in claim 15 wherein said serial bus is a universal serial bus.

18. The system as described in claim 12 wherein said detector includes a plurality of optical sensors each for detecting one of said color components of said color signal.

19. The system as described in claim 12 wherein said detector is a light pen.

20. The system as described in claim 12 wherein said detector is a video game gun and said objects are targets on said screen.

21. The system as described in claim 12 wherein said detector further includes means for sampling and holding a peak amplitude of said each color component of said color signal and means for digitizing said sampled amplitudes.

22. The system as described in claim 21 wherein each of said objects is identifiable by said peak amplitudes of said color components relative to each other.

23. The system as described in claim 22 wherein said controller includes an application capable of recognizing said each object by said peak amplitudes of said color components of said object's color signal.

24. The system as described in claim 21 wherein said circuitry for digitizing includes a single analog-to-digital converter.

25. The system as described in claim 21 wherein said circuitry for digitizing includes an analog-to-digital converter for each of said sampled color components.

* * * * *